US011541784B2

(12) United States Patent
Powell et al.

(10) Patent No.: US 11,541,784 B2
(45) Date of Patent: Jan. 3, 2023

(54) SEAT CONSOLE ASSEMBLY

(71) Applicant: LEAR CORPORATION, Southfield, MI (US)

(72) Inventors: Michael R. Powell, Waterford, MI (US); Karl Henn, New Hudson, MI (US); Paul S. Severinski, Brownstown, MI (US); Wee Tzee Gam, Troy, MI (US); Anthony James Mollica, Royal Oak, MI (US); Louella Ann Patterson, Goodells, MI (US)

(73) Assignee: LEAR CORPORATION, Southfield, MI (US)

( * ) Notice: Subject to any disclaimer, the term of this patent is extended or adjusted under 35 U.S.C. 154(b) by 10 days.

(21) Appl. No.: 17/025,719

(22) Filed: Sep. 18, 2020

(65) Prior Publication Data

US 2021/0078458 A1 Mar. 18, 2021

Related U.S. Application Data

(60) Provisional application No. 62/902,141, filed on Sep. 18, 2019.

(51) Int. Cl.
| | |
|---|---|
| *B60N 2/20* | (2006.01) |
| *B60N 2/32* | (2006.01) |
| *B60N 3/08* | (2006.01) |
| *B60N 3/10* | (2006.01) |
| *B60R 11/02* | (2006.01) |
| *B60R 11/00* | (2006.01) |

(52) U.S. Cl.
CPC .............. *B60N 2/206* (2013.01); *B60N 2/32* (2013.01); *B60N 3/08* (2013.01); *B60N 3/102* (2013.01); *B60R 11/02* (2013.01); *B60R 2011/0012* (2013.01)

(58) Field of Classification Search
CPC . B60N 2/206; B60N 2/32; B60N 3/08; B60N 3/102; B60R 11/02; B60R 2011/0012
USPC ........................................................ 297/182
See application file for complete search history.

(56) References Cited

U.S. PATENT DOCUMENTS

| | | | |
|---|---|---|---|
| 9,168,850 B2 * | 10/2015 | Meszaros ............. | B60N 2/3056 |
| 10,457,170 B2 * | 10/2019 | Line ...................... | B60N 3/101 |
| 2007/0182230 A1 * | 8/2007 | Bhatia ................... | B60N 3/101 |
| | | | 297/378.1 |
| 2018/0215319 A1 * | 8/2018 | Line ........................ | B60N 2/22 |
| 2019/0232839 A1 * | 8/2019 | Welch .................... | B60N 2/797 |
| 2020/0139861 A1 * | 5/2020 | Nevarez ............ | B64D 11/0639 |

* cited by examiner

*Primary Examiner* — Mark R Wendell
(74) *Attorney, Agent, or Firm* — Brooks Kushman P.C.

(57) ABSTRACT

A seat assembly is provided with a seatback having a forward surface to support an upper body of an occupant and an upper console portion formed on a rear surface of the seatback. The seatback pivots at a seatback pivot axis to a use position where the seatback extends generally horizontal. A bottom cushion has an upward surface to support a lower body of the occupant. The cushion pivots at a cushion pivot axis to an access position to access a lower console formed along an interior surface of the seat bottom cushion.

18 Claims, 4 Drawing Sheets

SEAT CONSOLE ASSEMBLY

CROSS-REFERENCE TO RELATED APPLICATIONS

This application claims the benefit of U.S. provisional application Ser. No. 62/902,141 filed Sep. 18, 2019, the disclosure of which is hereby incorporated in its entirety by reference herein.

TECHNICAL FIELD

The present application relates to a console assembly provided in a seat assembly.

BACKGROUND

One example of a seat console is shown in U.S. Pat. No. 7,677,656 assigned to Lear Corporation.

Another example of a console assembly is provided in U.S. Pat. No. 5,720,514 by Lear Corporation.

SUMMARY

According to at least one embodiment, a seat assembly is provided having a seat base configured to mounted to a floor. A bottom cushion is pivotally mounted to the seat base and has an upward seating surface to support a lower body of the occupant. The bottom cushion extends generally horizontal in a seating position and pivots forward at a cushion pivot axis to an access position to access a lower console formed within an interior surface of the bottom cushion and seat base. A seatback is pivotally mounted to the seat base and has a forward surface to support an upper body of an occupant and an upper console portion formed on a rear surface of the seatback. The seatback extends generally upright in a seating position and pivots forward at a seatback pivot axis to a upper console-use position where the seatback extends generally horizontal.

In another embodiment, the lower console has a panel pivotally connected to the interior surface of the bottom cushion, wherein the panel has a media ledge configured to hold a media device when panel pivots to a media-use position.

In another embodiment, in the media-use position, the panel extends upward from the bottom cushion.

In another embodiment, a free end of the bottom cushion is positioned adjacent the seatback pivot axis when the bottom cushion is in the seating position, and wherein the free end pivots forward when the bottom cushion is moved to the access position.

In another embodiment, the seat assembly has a panel connected to the interior surface of the bottom cushion at the free end, the panel configured to hold a media device when the bottom cushion is in the access position.

In another embodiment, the interior surface of the bottom cushion defines storage recess for use when the bottom cushion is in the access position.

In another embodiment, a rear cavity is formed in the seat base for receiving a garbage bin.

In another embodiment, the garbage bin is accessible when the seatback is in the use position, and where in the garbage bin is concealed when the seatback is in the seating position.

In another embodiment, the cushion pivot axis is positioned forward of the seatback pivot axis.

In another embodiment, the seat assembly has a lid connected to the rear surface of the seatback and moveable between a closed position and an open position to access an upper console bin defined in the seatback.

In another embodiment, the seat assembly has a first seat bottom, and a second seat bottom, wherein the first and second seat bottoms and the bottom cushion forming a seat row, wherein the bottom cushion forms up to twenty-percent of a width of the seat row.

According to at least one embodiment, a seat assembly is provided with a seatback having a forward surface to support an upper body of an occupant and an upper console portion formed on a rear surface of the seatback. The seatback pivots at a seatback pivot axis to a use position where the seatback extends generally horizontal. A bottom cushion has an upward surface to support a lower body of the occupant. The cushion pivots at a cushion pivot axis to an access position to access a lower console formed along an interior surface of the seat bottom cushion.

According to at least one embodiment, a method of using a seat assembly provides for pivoting a bottom cushion from a seating position to an access position. In the access position a lower console defined along an interior surface of the bottom cushion is accessible. The interior surface of the bottom cushion defines at least one recess configured to support an object when the bottom cushion is in the access position.

In another embodiment, the method pivots a seatback from the seating position to a console-use position after pivoting the bottom cushion. An upper console is defined along a rear surface of the seatback.

In another embodiment, the method accesses a bin defined rearward of the seatback after the seatback is pivoted to the use position.

In another embodiment, the method pivots a media panel to a media-use position, wherein the media panel is connected to the interior surface of the bottom cushion, wherein the recess comprises a media ledge defined on the media panel and configured to hold a media device.

In another embodiment, the recess comprises at least one cupholder.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The figures illustrate a seat assembly 10 being convertible to access a seat-console assembly 12. The seat assembly 10 is illustrated as a second row, however, the seat assembly may be positioned in other seating rows, such as a front row or third row, for example. Also, as illustrated and described, the seat assembly 10 is generally twenty percent of the overall width of the second row. However, the seat assembly 10 may provide any suitable percentage of the overall width of the row.

Figure 1:
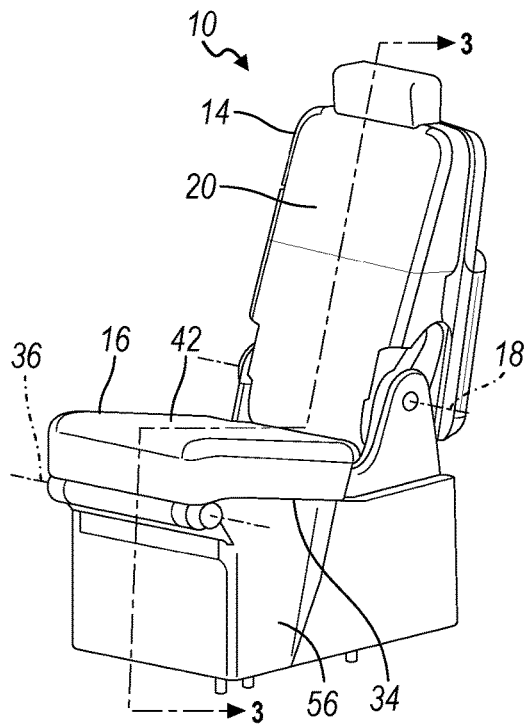
FIG. 1 illustrates a perspective view of a seat assembly being convertible to a console assembly, where the seat assembly is in a seating position.
Figure 2:
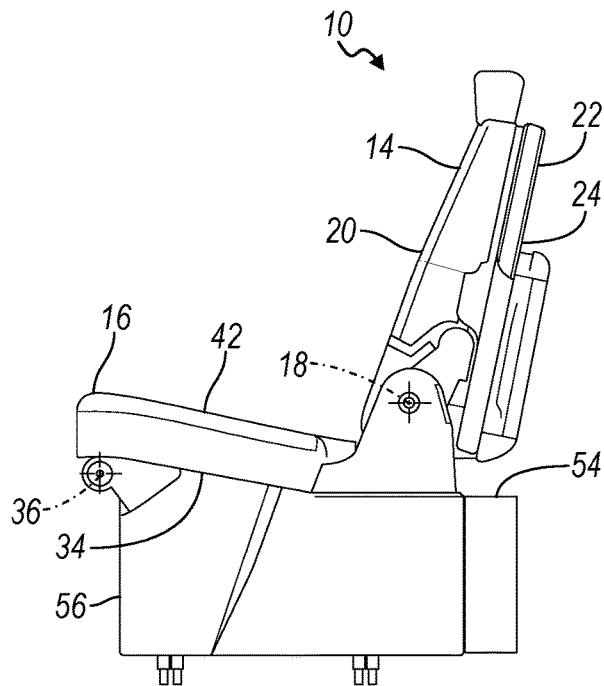
FIG. 2 illustrates a left-side view of the seat assembly in FIG. 1.

FIGS. 1-2 show a seat assembly 10 for a passenger vehicle. The seat assembly 10 has an upright seatback 14 and a seat bottom cushion 16. The seat assembly 10 includes a seat-console assembly 12. An upper console portion 24 is formed with the seatback 14 and a lower console portion 26 is formed with the seat bottom cushion 16.

Figure 3:
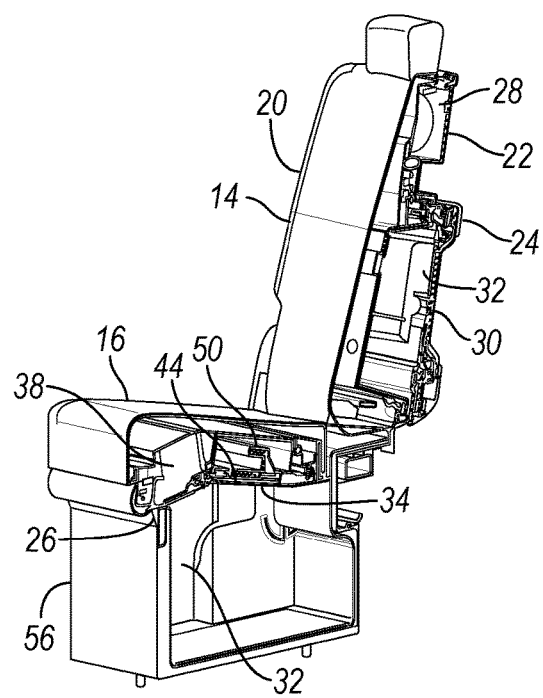
FIG. 3 illustrates a perspective view of section 3-3 of the seat assembly showing the console assembly compartments in storage positions when the seat assembly is in a seating position.
Figure 4:
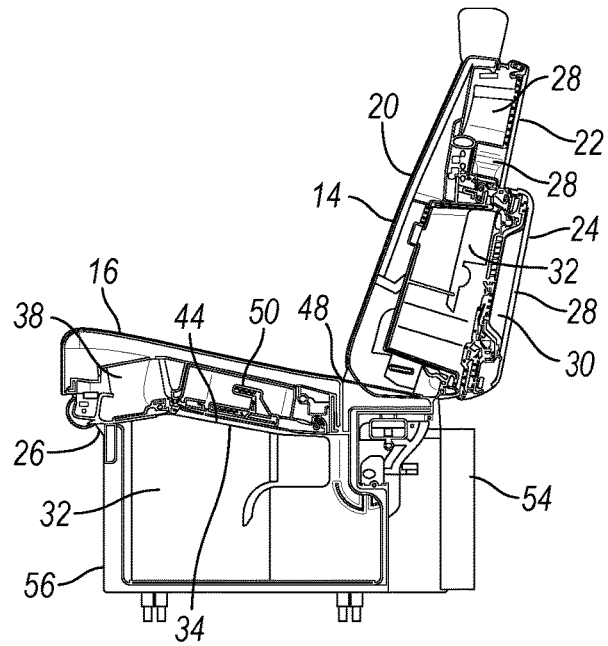
FIG. 4 illustrates a side view of section 3-3 of the seat assembly showing the console assembly compartments in storage positions when the seat assembly is in a seating position.
Figure 5:
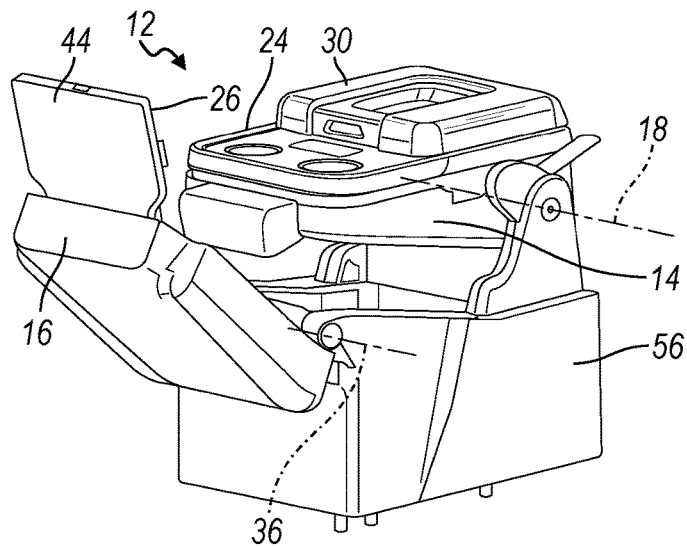
FIG. 5 illustrates a perspective view of the seat assembly in a storage position and the console assembly in use position.
Figure 6:
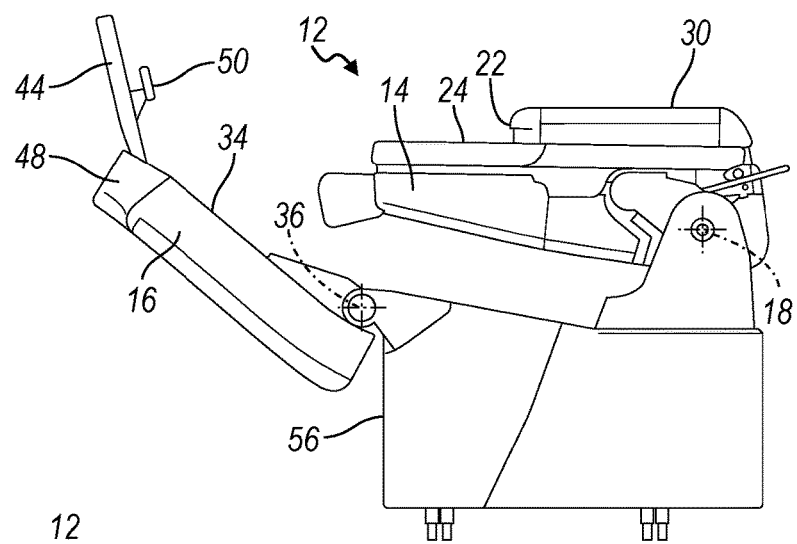
FIG. 6 illustrates a left-side view of the seat assembly in FIG. 5 a front view of the seat assembly in FIG. 5.
Figure 7:
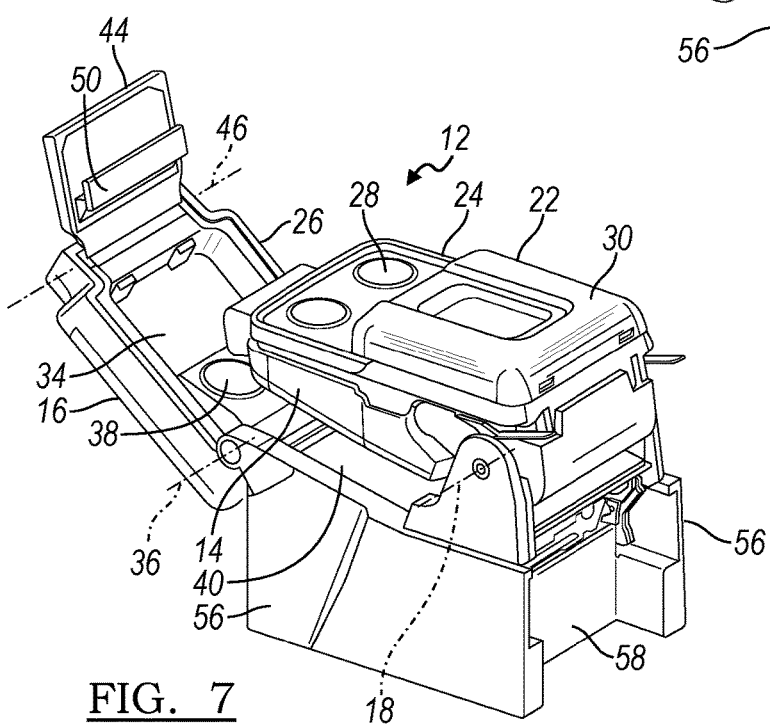
FIG. 7 illustrates a rear perspective view of the seat assembly in FIG. 5.

The seatback 14 has a forward seating surface 20 that extends generally upright to support the occupant when the seatback 14 is in the seating position. The upper console portion 24 is formed on the rear surface 22 of the seatback. The seatback 14 can be pivoted at the pivot axis 18 from the upright seating position shown in FIGS. 2-4, to a console-use position, as shown in FIGS. 5-7. Pivoting the seatback 14 pivots the seatback 14 toward the seat bottom cushion 16 to its console-use position and moves the upper console portion 24 to a console use configuration which may be generally horizontal or that is generally extends in the fore-aft direction and provides a support surface and/or armrest for the occupant of an adjacent seat.

Figure 12:
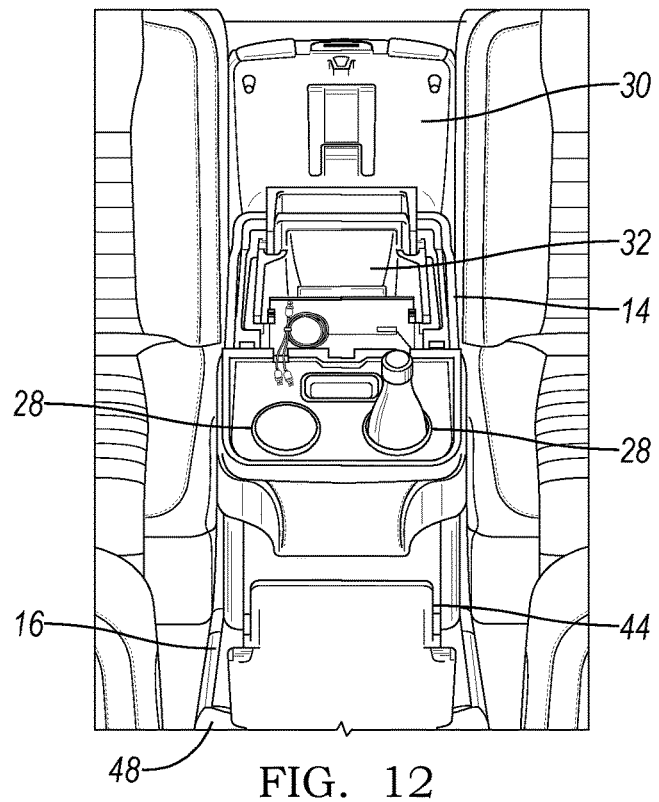
FIG. 12 illustrates a front view the seat assembly, where the seat assembly is in a storage position and the console assembly is in use.

As shown in FIGS. 5-7, the upper console portion 24 may have a plurality of recesses 28. The recesses may be formed of various openings and depths that define cupholders or conveniently hold other objects such as mobile phones, change, pens, pencils wallets or other suitable recesses shapes. At least a portion of the upper console portion 24 may include a lid 30 configured to pivot, as shown in FIG. 12. The lid 30 may be latched, but releasably pivots to an open position to access an upper storage bin 32. The upper storage bin 32 extends from the rear surface of the seatback 14 inward.

FIGS. 5-7 also shows the lower console portion 26 pivoted forward so an interior surface 34 of the seat bottom cushion 16 provides access to the lower console portion 26. The seat bottom cushion 16 has the seating surface 42 to support the occupant when the seat bottom is in the seating position. In a seating position, the bottom cushion 16 extends generally but may be contoured or angled slightly to comfortably support the lower body of an occupant. The seat bottom cushion 16 can be pivoted at a forward pivot axis 36 from the seating position shown in FIGS. 2-4, to a console-access position, as shown in FIGS. 5-7.

The seat bottom cushion 16 is connected to a seat base 56 and pivots forward to the access position about the forward pivot axis 36. In this access position, the lower console portion 26 is accessible including recesses 38, such as cupholders formed on the interior surface 34 of the seat bottom cushion 16 and a lower storage bin 40 formed within the base 56.

In the seating position, a free end 48 of the seat bottom cushion 16 is positioned adjacent the seatback 14. To access the lower console portion 26, the free end 48 lifts and pivots forward. The lower storage bin 40 may extend downward toward the vehicle floor and may be large enough to hold a backpack, for example. In the access position, the bottom cushion 16 may not be horizontal or flat and may extend at an upward angle, as shown in FIG. 5-7. The recesses 38 may be formed to support objects At least a portion of the lower console portion 26 may include a panel 44 configured to pivot, as shown in FIGS. 5-7. The panel 44 pivots from a panel pivot axis 46 at a free end 48 of the lower console portion 26 to provide a media-use position. The panel 44 may include a media ledge 50 extending transverse to the panel 44. The media ledge 50 may hold a media device such as a tablet, mobile phone, portable screen or other device in an upright position at a height for easy viewing by the occupant seated in an adjacent seat. In the media-use position, the panel 44 extends upward from the interior surface 3

The lower console portion 26 may include a power outlet to provide an easy power connection to devices positioned on the media ledge 50. The media panel 44 and lower console portion may provide charging ports, 12 v, 110 v and USB/C, audio jacks, or other suitable inlet and outlet ports such as power and data ports. The panel 44 and media ledge 50 may also allow for devices to be wirelessly charged, such as with an inductive charging contact surface.

When the seatback 14 pivots forward, a garbage bin 54 is accessible rearward of the rear edges of the seatback 14 and seat bottom cushion 16. The garbage bin 54 may be removable from a cavity 58 formed along the rear of the base 56. The garbage bin 54 is concealed by the seatback 14 when the seatback 14 is in a seating position. Occupants may easily dispose of garbage in the designated bin 54 to keep the vehicle clean. The garbage bin 54 may be removable from the base 56 to allow the contents to be easily emptied.

The storage bins 32, 40 may also have integrated lighting. For example, the lower console storage bin 40 may have a light that illuminates the lower storage bin 40 when the seat bottom cushion 16 is pivoted forward. Similarly, the upper storage bin 32 may have a light that is activated when the lid 30 is opened.

Figure 8:
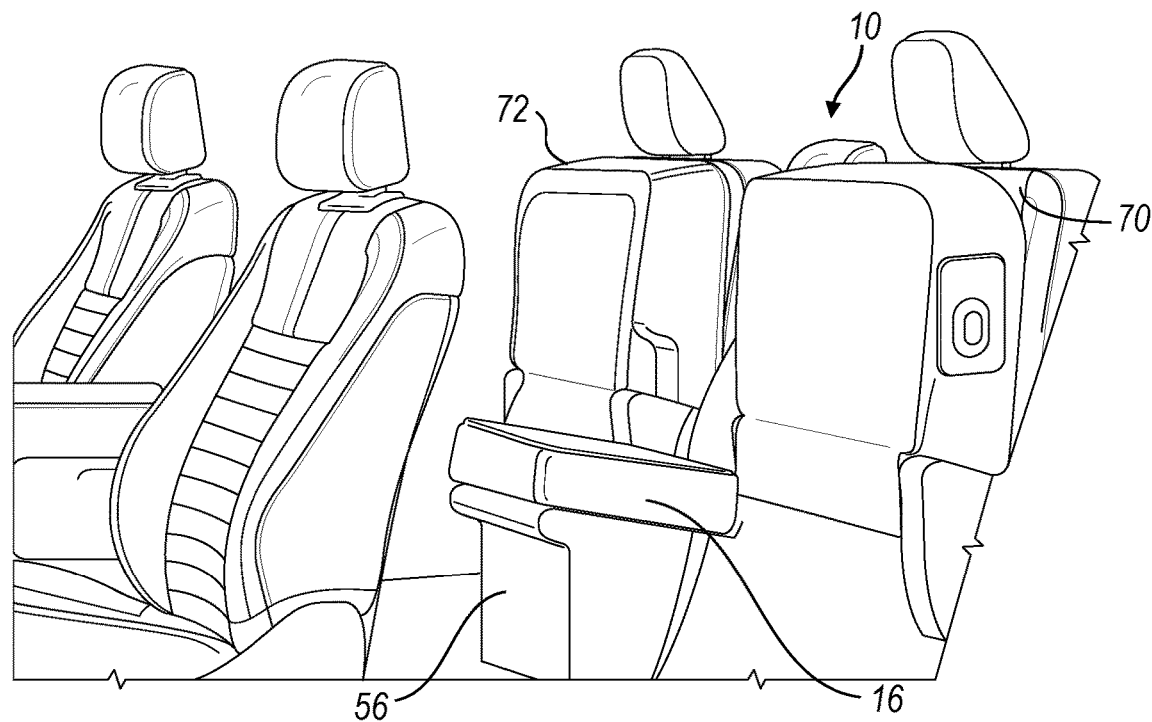
FIG. 8 illustrates the seat assembly as installed in the second row in the center position, where the seat assembly is in a seating position and the adjacent side seat assemblies are shown with the seat cushion folded upright.

FIG. 8 shows the seat assembly 10 as installed in the second row in the center position between adjacent first and second side seat assemblies 70, 72. The seat assembly 10 is in a seating position and the adjacent side seat assemblies 70, 72 are shown with the seat cushion folded upright.

Figure 9:
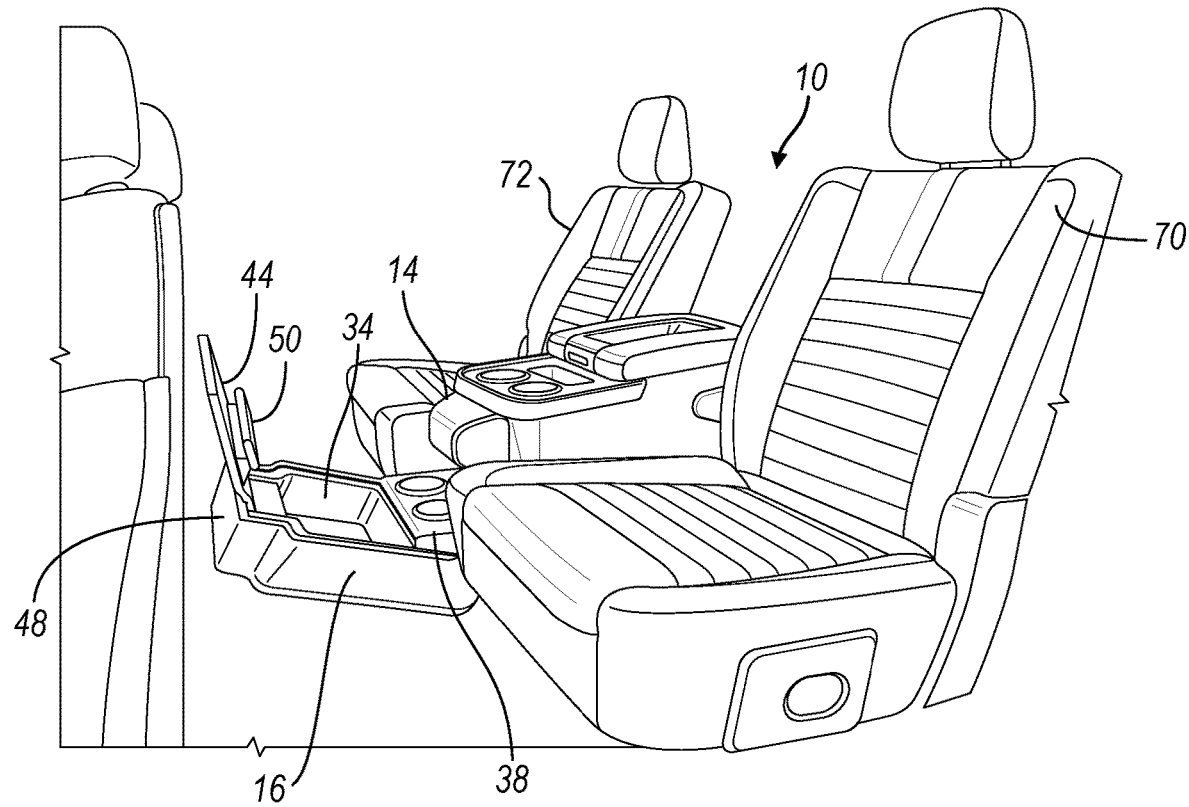
FIG. 9 illustrates the seat assembly as installed in the second row in the center position, where the seat assembly is in a storage position and the console assembly is in use.

FIG. 9 shows the seat assembly 10 where the seat bottom cushion 16 is pivoted so the lower console portion 26 is accessible when the bottom cushion 16 is in an access position. The panel 44 is pivoted up. The seatback 14 is pivoted down so the upper console portion 24 is also in a use position.

Figure 10:
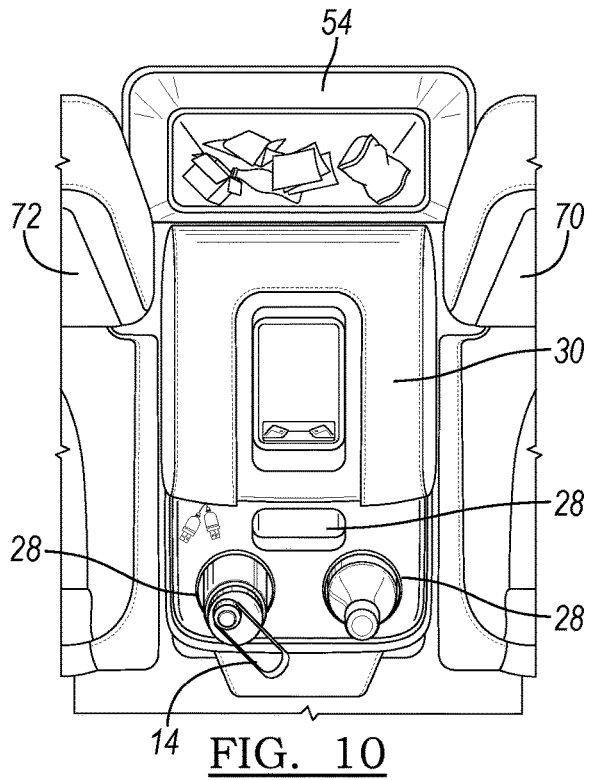
FIG. 10 illustrates a top view the seat assembly, where the seat assembly is in a storage position and the console assembly is in use.

FIG. 10 shows the seat assembly 10 in a storage position and the seat-console assembly 12 is in use. The seatback 14 is pivoted down so the upper console portion 24 is in a use position. The garbage bin 54 is visible rearward of the lid 30 of the upper console portion 24. The seat bottom cushion 16 is not pivoted forward and remains in a seating position.

Figure 11:
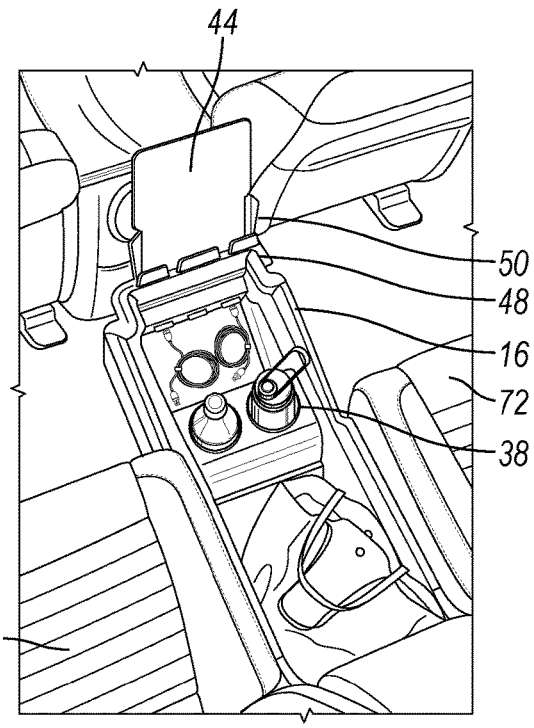
FIG. 11 illustrates a top view the seat assembly, where the seat assembly is in a storage position and the console assembly is in use.

FIG. 11 shows the seat assembly 10 in a storage position and the seat-console assembly 12 is in use. The seat bottom cushion 16 is pivoted forward so the lower console portion 26 is in a use position. The lower storage bin 40 is visible between adjacent seats. The seatback 14 is not pivoted down and remains in the seating position.

FIG. 12 shows the seat assembly 10 with the seat-console assembly 12 is in use. The seatback 14 is pivoted down so the upper console portion 24 is in a use position. The lid 30 of the upper console portion 24 is unlatched and hinged to an open position so the upper storage bin 32 is visible and accessible. The upper bin 32 may have power outlets and cutouts to allow power cables to extend from the bin 32 even when the lid 30 is latched closed.

The following are a list of reference numerals shown in the Figures.

seat assembly 10
 seat-console assembly 12
 upright seatback 14
 seat bottom cushion 16
 seatback pivot axis 18
 forward seating surface 20
 rear seatback surface 22
 upper console portion 24
 lower console portion 26
 recesses 28
 lid 30
 upper console bin 32
 interior surface of bottom cushion 34
 bottom cushion pivot axis 36
 lower console recesses 38
 lower console storage bin 40
 seating surface of seat bottom 42
 lower media panel 44
 panel pivot axis 46
 free end of bottom cushion 48
 media ledge 50
 garbage bin 54
 seat base 56
 bin cavity in seat base 58
 first side seat 70
 second side seat 72

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
 a seat base configured to be mounted to a floor;
 a bottom cushion pivotally mounted to the seat base and having an upward seating surface to support a lower body of the occupant, and an interior surface opposite the upward seating, wherein the bottom cushion extends generally horizontal in a seating position, and wherein the bottom cushion pivots forward at a cushion pivot axis to an access position to access a lower console formed within the seat base, and
 a seatback pivotally mounted to the seat base and having a forward surface to support an upper body of an occupant and an upper console portion formed on a rear surface of the seatback, wherein the seatback extends generally upright in a seating position, and the seatback pivots forward at a seatback pivot axis to a console-use position where the seatback extends generally horizontal,
 wherein when the seatback is in the console-use position and the bottom cushion is in the access position, the bottom cushion and the interior surface extend at an upward angle and has at least one recess configured to support an object when the bottom cushion is in the access position,
 wherein the interior surface and recess are visible while the seatback is in the console-use position.

2. The seat assembly of claim 1, wherein the interior surface of the bottom cushion has a media ledge configured to hold a media device when the bottom cushion is in the access position.

3. The seat assembly of claim 2, wherein the lower console has a panel pivotally connected to the interior surface of the bottom cushion, wherein the panel is configured to pivots to a media-use position in which the panel extends upward from the bottom cushion.

4. The seat assembly of claim 3, wherein a free end of the bottom cushion is positioned adjacent the seatback pivot axis when the bottom cushion is in the seating position, and wherein the free end pivots forward when the bottom cushion is moved to the access position, wherein the panel is connected to the interior surface of the bottom cushion adjacent the free end.

5. The seat assembly of claim 4, further comprising a panel connected to the interior surface of the bottom cushion at the free end, the panel configured to hold a media device when the bottom cushion is in the access position.

6. The seat assembly of claim 1, wherein a rear cavity is formed in the seat base for receiving a garbage bin.

7. The seat assembly of claim 6, wherein the garbage bin is accessible when the seatback is in the console-use position, and where in the garbage bin is concealed when the seatback is in the seating position.

8. The seat assembly of claim 1, wherein the cushion pivot axis is positioned forward of the seatback pivot axis, wherein the bottom cushion extends forward of the seatback.

9. The seat assembly of claim 1, further comprising a lid connected to the rear surface of the seatback and moveable between a closed position and an open position to access an upper console bin defined in the seatback.

10. The seat assembly of claim 1, further comprising a first seat bottom, and a second seat bottom, wherein the first and second seat bottoms and the bottom cushion forming a seat row, wherein the bottom cushion forms up to twenty-percent of a width of the seat row.

11. A seat assembly comprising:
 a seatback having a forward surface to support an upper body of an occupant and an upper console portion formed on a rear surface of the seatback, wherein the seatback pivots at a seatback pivot axis to a console-use position where the seatback extends generally horizontal; and a bottom cushion with an upward surface to support a lower body of the occupant and an interior surface formed opposite the upward surface, wherein the bottom cushion pivots at a cushion pivot axis to an access position to access the interior surface, wherein the interior surface has a media ledge configured to hold a media device when the bottom cushion is in the access position, wherein the interior surface and media-ledge are visible while the seatback is in the console-use position.

12. The seat assembly of claim 11, further comprising a seat base configured for mounting the seat assembly to a floor, wherein the bottom cushion pivots relative to the seat base, wherein a storage bin is defined within the seat base, wherein the storage bin is concealed when the bottom cushion is in a seating position and the storage bin is accessible when the bottom cushion is in the access position.

13. The seat assembly of claim 11, wherein the interior surface extends at an upward angle when the bottom cushion is in the access position.

14. The seat assembly of claim 11, wherein the media ledge is formed on a panel configured to pivot relative to the interior surface of the bottom cushion, the media ledge extends transverse to the panel.

15. A method of using a seat assembly comprising:

pivoting a bottom cushion from a seating position to an access position, wherein in the access position to access an interior surface of the bottom cushion, wherein the bottom cushion extends at an upward angle in the access position and the interior surface of the bottom cushion defines at least one recess configured to support an object when the bottom cushion is in the access position; and pivoting a seatback from the seating position to a console-use position after pivoting the bottom cushion, wherein an upper console is defined along a rear surface of the seatback, wherein the interior surface and recess are visible while the seatback is in the console-use position.

16. The method of claim 15, further comprising accessing a bin defined rearward of the seatback after the seatback is pivoted to the console-use position.

17. The method of claim 15, further comprising pivoting a media panel to a media-use position, wherein the media panel is connected to the interior surface of the bottom cushion, wherein the recess comprises a media ledge defined on the media panel and configured to hold a media device.

18. The method of claim 15, wherein the recess comprises at least one cupholder.

* * * * *